Patented Mar. 3, 1942

2,275,130

UNITED STATES PATENT OFFICE 2,275,130

DISAZO DYESTUFFS

Wilfrid Herbert Cliffe, Arnold Kershaw, and Arthur Howard Knight, Blackley, Manchester, England, assignors to Imperial Chemical Industries Limited, a corporation of Great Britain No Drawing. Application July 25, 1940, Serial No. 347,556. In Great Britain July 27, 1939

11 Claims. (Cl. 260—160)

The present invention relates to the manufacture of new disazo dyestuffs.

According to the invention we make new disazo dyestuffs by coupling certain tetrazotised di-(amino-N-substituted) anilides of benzenedicarboxylic acids, as further defined below, with one molecular proportion of an arylpyrazolone, and also with either one molecular proportion of the same or a different arylpyrazolone or one molecular proportion of salicylic acid, the arylpyrazolones being such that the final dyestuff contains at least one sulphonic acid group.

The dianilides which are referred to above are compounds of the general formula $$Ar(CO.NR.Ar'.NH_2)_2$$

in which each R stands for the same alkyl (with not more than 8 carbon atoms), phenalkyl, cycloalkyl or phenyl group, Ar and Ar' stand for the same or different phenylene groups, the amino groups being attached in corresponding positions in the two Ar' groups, and Ar and Ar', and the phenalkyl and phenyl groups represented by R, carrying, if desired, one or more substituents, e. g. chlorine, bromine, methyl or methoxyl, the substituents being such that the two NR.Ar' groupings are the same.

As examples of arylpyrazolone components which may be used there may be mentioned 1-(4' - sulphophenyl) -3-methyl-5-pyrazolone, 1-(2'-chloro-5'-sulphophenyl)-3-methyl-5-pyrazolone, 1-(2':5' - dichloro - 4' - sulphophenyl) - 3 - methyl-5-pyrazolone, 1-(4'-sulphophenyl)-5-pyrazolone-3-carboxylic acid or its alkyl esters, 1-phenyl-3-methyl-5-pyrazolone, 1 - (2' - chloro - phenyl)-3-methyl-5-pyrazolone, 1 - (4' - methylphenyl)-3-methyl-5-pyrazolene, 1 - (3' - sulphophenyl)-3-methyl-5-pyrazolene, 1-(3' - carboxyphenyl)-3-methyl-5-pyrazolone, 1 - (2' - methyl-5'-sulphophenyl)-3-methyl-5-pyrazolone, 1 - (4'-chloro-2' - sulphophenyl)-3-methyl-5-pyrazolone, 1-(2'-chloro-4'-methyl-5' - sulphophenyl) - 3 - methyl-5-pyrazolone, 1-(6'-chloro-3'-methyl-4'-sulphophenyl)-3-methyl-5 - pyrazolone, 1 - (4' - methoxy-2'-sulphophenyl)-3-methyl - 5 - pyrazolone, 1-(4'-ethoxy-2'-sulphophenyl) - 3 - methyl-5-pyrazolone and 1 - (4' - sulphonaphthyl) - 3 - methyl-5-pyrazolone.

The dianilides may be made, for example, by reacting one molecular proportion of the appropriate dicarboxylic acid dichloride with two molecular proportions of the appropriate nitro-N-alkyl-,-phenalkyl-, -cycloalkyl- or -aryl-amine of the benzene series and then reducing the nitro groups. Reduction can be carried out with iron and hydrochloric acid in a solvent such as ethyl alcohol or n-butyl alcohol, or catalytically, as for example by hydrogen under pressure at 60-100° C. in a solvent such as methyl alcohol in the presence of a Raney-nickel catalyst.

As examples of benzenedicarboxylic acids which may be used, there may be mentioned, phthalic, isophthalic, terephthalic, 4-chlorophthalic and 3:6-dichlorophthalic acids.

The new dyestuffs can be employed for colouring animal fibres, e. g. wool and silk, and according to the invention we apply them for colouring such fibres. In general yellow shades are obtained. The dyestuffs can be applied from an acid dyebath. Some of them give very good exhaustion when dyed from a neutral dyebath (e. g. a dyebath containing 2% of ammonium acetate on the weight of material to be dyed).

The dyeings on wool, whether from neutral or acid bath, are characterized in general by good fastness to washing, milling, perspiration, sulphur stoving and light.

The invention is illustrated, but not limited, by the following examples in which the parts are by weight.

Example 1

55.4 parts of terephthalic-di-(4-amino-2-N-benzyl-toluidide), i. e. the compound of formula

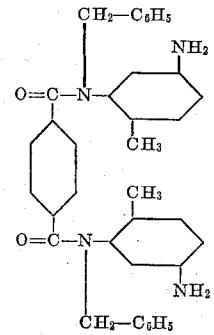

(made as described below) are dissolved in 500 parts of 3.6% hydrochloric acid by heating to 90–100° C. and the solution so-obtained cooled to 30–35° C. A solution of 14.0 parts of sodium nitrite in 100 parts of water is then added. Tetrazotisation is rapid. The solution of the tetrazo compound, after filtration if necessary, is then cooled to 5–10° C. and added, with good stirring, to a solution at 5° C. of 55.2 parts of the sodium salt of 1-(4'-sulphophenyl)-3-methyl-5-pyrazolone in 600 parts of water containing 42 parts of anhydrous sodium carbonate and 100 parts of sodium chloride. Stirring is continued until coupling is complete. The new dyestuff is then isolated by heating the suspension to 60° C. adding a further 50 parts of sodium chloride and filtering. It is then dried. The dry substance is yellowish and dissolves in water with a reddish-yellow colour and in concentrated sulphuric acid with a similar colour. It dyes wool in reddish-yellow shades from an acid dyebath or from a dyebath containing 2% ammonium acetate. The dyeings have very good fastness to washing, milling, perspiration, sulphur stoving and light.

Terephthalic-di-(4-amino-2-N-benzyl)toluidide is obtained by reacting one molecular proportion of terephthaloyl chloride with two molecular proportions of 4-nitro-2-N-benzyl-toluidine in toluene to give terephthaloyl-di-(4-nitro-2-N-benzyl)toluidide, M. P. 214° C. and reducing the latter with iron and hydrochloric acid in ethyl alcohol solution. It melts at 212° C.

Similar dyestuffs are obtained if instead of 1-(4'-sulphophenyl)-3-methyl-5-pyrazolone there is used 1-(4'-sulphophenyl)-5-pyrazolone-3-carboxylic acid or its methyl or ethyl ester.

Example 2

In Example 1, instead of 55.2 parts of the sodium salt of 1-(4'-sulphophenyl)-3-methyl-5-pyrazolone there are used 69 parts of the sodium salt of 1-(2':5'-dichloro-4'-sulphophenyl)-3-methyl-5-pyrazolone.

The new dyestuff is yellow in colour and dissolves in both water and concentrated sulphuric acid with a reddish-yellow colour. It dyes wool from an acid dyebath or from a dyebath containing 2% ammonium acetate in greenish-yellow shades. The dyeings have excellent fastness to washing, milling, perspiration and sulphur stoving, and very good fastness to light.

Example 3

55.4 parts of phthalic-di-(4-amino-2-N-benzyl)-toluidide (made as described below) are dissolved in 800 parts of 2.25% hydrochloric acid by heating to 80° C. and the solution so-obtained cooled to 15° C. with stirring. The dihydrochloride of the diamine separates as a cream. A solution of 13.8 parts of sodium nitrite in 100 parts of water is then added. Tetrazotisation is rapid, the tetrazo compound dissolving. The tetrazo solution, after cooling to 5–7° C. is added, with good stirring, to a cooled solution (0–5° C.) of 69 parts of the sodium salt of 1-(2':5'-dichloro-4'-sulphophenyl)-3-methyl-5-pyrazolone in 600 parts of water containing 42 parts of anhydrous sodium carbonate. Stirring is continued until coupling is complete. The dyestuff suspension is then heated to 40° C., 160 parts of sodium chloride added in portions, and the dyestuff filtered off and dried.

The new dyestuff dyes wool from an acid bath or from a bath containing 2% ammonium acetate in greenish-yellow shades, the dyeings having good fastness to washing, milling, perspiration, sulphur stoving and light.

Phthalic-di-(4-amino-2-N-benzyl)toluidide is made by reacting one molecular proportion of symmetrical o-phthaloyl chloride with two molecular proportions of 4-nitro-2-N-benzyltoluidine to give phthalic-di-(4-nitro-2-N-benzyl)-toluidide, M. P. 266–7° C. which is then reduced with iron and hydrochloric acid in ethyl alcohol solution. It has M. P. 222° C.

Example 4

40.2 parts of terephthalic-di-(4-amino-1-N-ethyl)anilide are dissolved in 600 parts of 3% hydrochloric acid and tetrazotised at 10–15° C. by the addition of 13.8 parts of sodium nitrite dissolved in 100 parts of water. Enough sodium acetate is added to neutralise the mineral acidity of the solution of the tetrazo compound and then another 14.5 parts of sodium acetate are added. To the resulting solution a neutral solution of 34.5 parts of the sodium salt of 1-(2':5'-dichloro-4'-sulphophenyl)-3-methyl-5-pyrazolone in 600 parts of water is added with good stirring. After 10–15 minutes further stirring no colour reaction should be given by spotting a portion of the coupling mixture on filter paper and adding a drop of alkaline H-acid solution to the clear rim, or by adding a drop of a neutral solution of diazo p-nitrobenzene. If necessary a further small portion of a solution of the coupling component or of the tetrazo component is added until this condition is fulfilled. When the first coupling is complete the suspension of the diazo-monoazo compound so-obtained is cooled to 5–7° C. and added with stirring to a solution of 17.4 parts of 1-phenyl-3-methyl-5-pyrazolone in 700 parts of water, to which has been added 4 parts of sodium hydroxide, 42 parts of anhydrous sodium carbonate and 80 parts of sodium chloride. The second coupling is rapid and, when complete, the new dyestuff is isolated by adding a further 160 parts of sodium chloride and filtering. It is then dried.

When dry the dyestuff is reddish-yellow in colour and dissolves in water with a yellow colour and in concentrated sulphuric acid with a greenish-yellow colour. It dyes wool from an acid bath in yellow shades of good fastness properties.

Terephthalic-di-(4-amino-1-N-ethyl)anilide is obtained by reacting one molecular proportion of terephthaloyl chloride with two molecular proportions of 4-nitro-1-N-ethylaniline to give terephthalic-di-(4-nitro-1-N-ethyl)anilide, M. P. 267° C. and this is then reduced at 80–100° C. with hydrogen under pressure, in methanol, in the presence of a nickel catalyst. The diamine has M. P. 300° C.

Example 5

In Example 4 instead of 17.4 parts of 1-phenyl-3-methyl-5-pyrazolone there are used 13.8 parts of salicylic acid. Stirring of the final coupling mixture is continued for several hours to complete the coupling.

The new dyestuff dyes wool from an acid bath in yellow shades of good fastness properties.

The invention is further illustrated by the dyestuffs of the following table:

being alike; E is a pyrazolone having a sulfoaryl group; and E' is a coupling component of the

| Ex. No. | Tetrazo component from— | Coupling component (S) | Shade on wool |
|---|---|---|---|
| 6 | Terephthalic di-(4-amino-1-N-n-butylanilide) (M. P. 157° C.). | 1-4'-sulphophenyl)-3-methyl-5-pyrazolone. | Dull yellow. |
| 7 | ditto | 1-(3'-sulphophenyl)-3-methyl-5-pyrazolone. | Yellow. |
| 8 | ditto | 1-(4'-sulphonaphthyl)-3-methyl-5-pyrazolone and 1-(2':5'-dichloro-4'-sulphophenyl)-3-methyl-5-pyrazolone. | Reddish-yellow. |
| 9 | ditto | 1-(4'-sulphophenyl)-3-methyl-5-pyrazolone and 1-(2'-chloro-5'-sulphophenyl-3-methyl-5-pyrazolone. | Do. |
| 10 | ditto | 1-(2':5'-dichloro-4'-sulphophenyl)-3-methyl-5-pyrazolone and 1-phenyl-3-methyl-5-pyrazolone. | Do. |
| 11 | ditto | 1-(2':5'-dichloro-4'-sulphophenyl)-3-methyl-5-pyrazolone and 1-(4'-sulphophenyl)-3-methyl-5-pyrazolone. | Do. |
| 12 | Phthalic di-(4-amino-2-N-benzylanisidide) (M. P. 182° C.) | 1-(4'-sulphophenyl)-3-methyl-5-pyrazolone. | Very reddish-yellow. |
| 13 | Terephthalic di-(4-amino-1-N-ethylanilide). | 1-(2':5'-dichloro-4'-sulphophenyl)-3-methyl-5-pyrazolone. | Greenish-yellow. |
| 14 | Phthalic di-(4-amino-1-N-ethylanilide) (M. P. 244° C.). | do | Do. |
| 15 | Phthalic di-(4-amino-1-N-ethylanilide) (M. P. 244° C.) | 1-(4'-sulphophenyl)-3-methyl-5-pyrazolone. | Reddish-yellow. |
| 16 | Terephthalic di-(4-amino-1-N-ethylanilide). | 1-(2':5'-dichloro-4'-sulphophenyl)-3-methyl-5-pyrazolone and 1-(2'-chlorophenyl)-3-methyl-5-pyrazolone. | Greenish-yellow. |
| 17 | Phthalic di-(4-amino-2-N-benzyltoluidide). | do | Do. |
| 18 | Phthalic di-(4-amino-1-N-phenylanilide) (M. P. 228° C.). | 1-(2':5'-dichloro-4'-sulphophenyl)-3-methyl-5-pyrazolone. | Yellow. |
| 19 | Terephthalic di-(4-amino-1-N-cyclohexylanilide) (M. P. 233-4° C.). | do | Greenish-yellow. |
| 20 | Terephthalic di-(4-amino-2-N-ethyltoluidide) (M. P. 250-1° C.). | 1-(6'-chloro-3'-methyl-4'-sulphophenyl)-3-methyl-5-pyrazolone and 1-phenyl-3-methyl-5-pyrazolone. | Reddish-yellow. |
| 21 | Phthalic di-(4-amino-2-N-ethyltoluidide) (M. P. 234° C.). | do | Do. |
| 22 | Phthalic di-(4-amino-2-N-benzyltoluidide). | 1-(4'-sulphophenyl)-3-methyl-5-pyrazolone. | Do. |
| 23 | Terephthalic di-(4-amino-1-N-n-octylanilide). | 1-(4'-sulphophenyl)-3-methyl-5-pyrazolone. | Dull yellow. |
| 24 | Iso-phthalic di-(4-amino-2-N-benzyltoluidide). | do | Reddish-yellow |

We claim:
1. An azo dyestuff represented by the formula

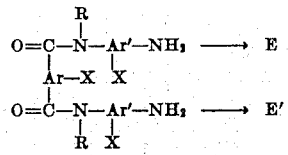

wherein Ar and Ar' are nuclei of the benzene series; X is from a group consisting of hydrogen, chlorine, bromine, methyl and methoxy; each R is one of a group consisting of alkyl having not more than 8 carbons, cyclohexyl,

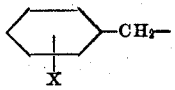

and

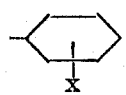

the two

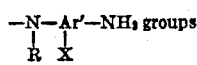

group consisting of E, arylpyrazolones which are devoid of sulfo groups of salicylic acid.

2. A dyestuff in accordance with claim 1 in which Ar is the nuclear radical of a terephthalic acid.

3. A dyestuff in accordance with claim 1 in which both coupling components are arylpyrazolones having a sulfoaryl group.

4. A dyestuff which is represented in its acid form by the formula

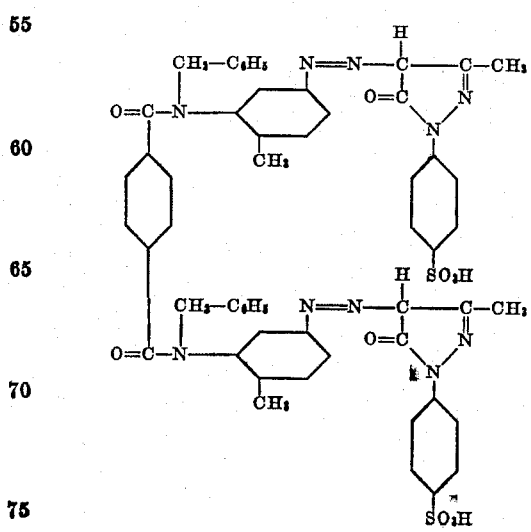

5. A dyestuff which is represented in its acid form by the formula

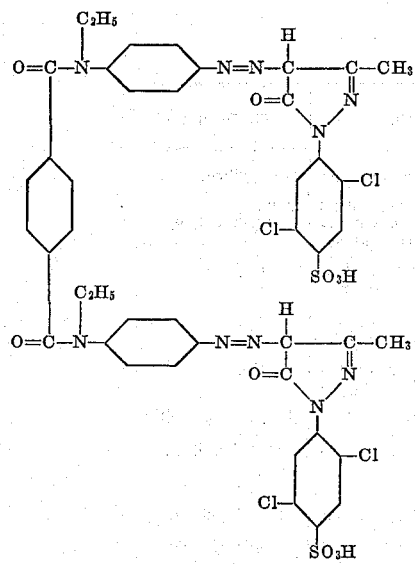

6. A dyestuff which is represented in its acid form by the formula

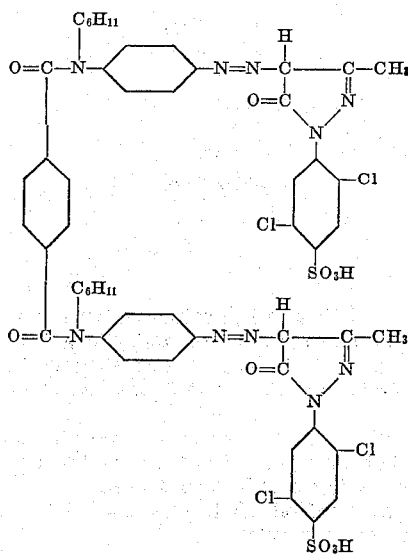

7. The process of manufacturing new disazo dyestuffs which comprises tetrazotizing a di-(amino-N-substituted)anilide of a dicarboxylic acid of the benzene series which is represented by the formula

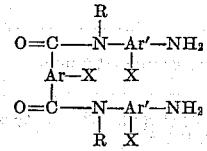

wherein Ar and Ar' are nuclei of the benzene series; X is from a group consisting of hydrogen, chlorine, bromine, methyl and methoxy; each R is one of a group consisting of alkyl having not more than 8 carbons, cyclohexyl,

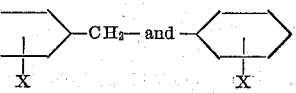

the two

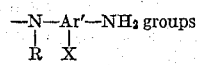

being alike; coupling the tetrazo with one molecular proportion of a pyrazolone having a sulfoaryl group; and then coupling with one molecular proportion of a coupling component of a group consisting of pyrazolones having a sulfoaryl group, arylpyrazolones which are devoid of sulfo groups and salicylic acid, the final coupling being made in alkaline medium.

8. The process in accordance with claim 7 in which the di-amino anilide is a di-(amino-N-substituted)anilide of terephthalic acid.

9. The process in accordance with claim 7 in which the di-amino anilide is a di-(amino-N-substituted)anilide of terephthalic acid and both pyrazolones used as coupling components have sulfoaryl groups.

10. The process in accordance with claim 7 in which at least one of the aryl pyrazolones is 1-(2',5'-dichloro-4'-sulfophenyl) - 3 - methyl-5 - pyrazolone.

11. The process in accordance with claim 7 in which the diazotized di-amino anilide is coupled with two molecular proportions of 1-(2',5'-dichloro-4'-sulfophenyl)-3-methyl-5-pyrazolone.

WILFRID HERBERT CLIFFE.
ARNOLD KERSHAW.
ARTHUR HOWARD KNIGHT.

CERTIFICATE OF CORRECTION.

Patent No. 2,275,130.                            March 3, 1942.

WILFRID HERBERT CLIFFE, ET AL.

It is hereby certified that error appears in the printed specification of the above numbered patent requiring correction as follows: Page 3, second column, line 42, claim 1, for the words "groups of" read --groups and--; and that the said Letters Patent should be read with this correction therein that the same may conform to the record of the case in the Patent Office.

Signed and sealed this 5th day of May, A. D. 1942.

Henry Van Arsdale, (Seal)                              Acting Commissioner of Patents.